Aug. 2, 1955  M. W. PASCAL  2,714,551
APPARATUS FOR SOLVENT EXTRACTION OF VEGETABLE OILS
Filed Aug. 13, 1949  2 Sheets-Sheet 1

INVENTOR
MICHAEL W. PASCAL
BY

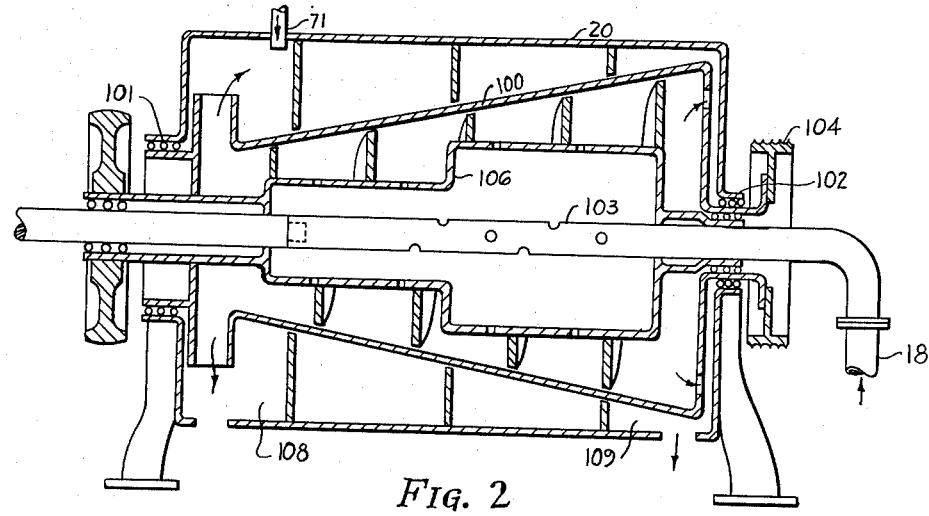
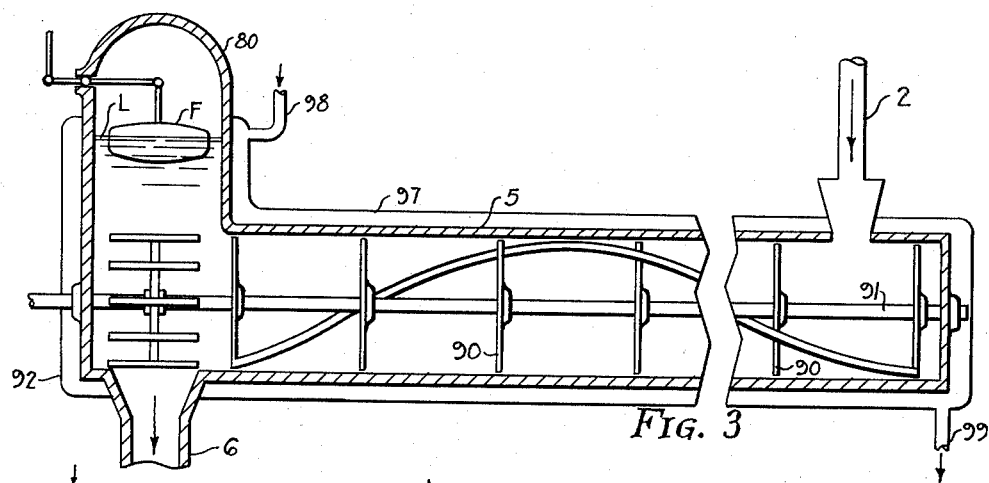
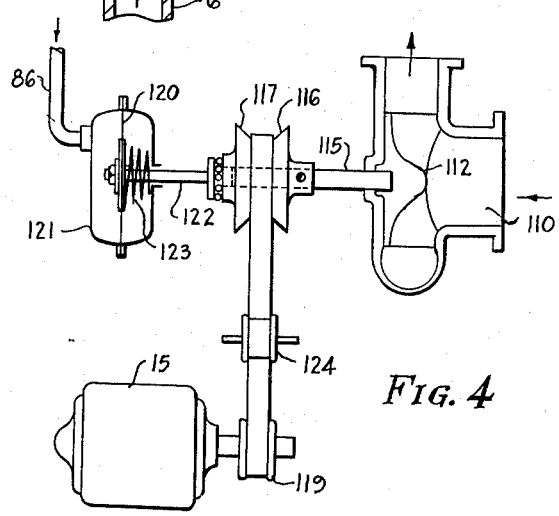

United States Patent Office 2,714,551
Patented Aug. 2, 1955

2,714,551

APPARATUS FOR SOLVENT EXTRACTION OF VEGETABLE OILS

Michael W. Pascal, Shaker Heights, Ohio, assignor to The Sherwin-Williams Company, Cleveland, Ohio, a corporation of Ohio Application August 13, 1949, Serial No. 110,142

2 Claims. (Cl. 23—270)

This invention relates to continuous systems for the solvent extraction of vegetable oils from oil-bearing seeds, nuts, beans, and the like. More particularly, the invention relates to continuous oil extraction systems involving an overall countercurrent flow of solvent and seeds from stage to stage of a multistage extraction plant, with concurrent flow within each stage.

The present invention relates to an improved apparatus especially suited for the extraction of oil-bearing seeds of the type which disintegrate into a loose pulp containing a large proportion of "fines," and which resist separation from the solvent by conventional means, as hereinafter described.

The difficulties heretofore encountered in the attempts to treat oil-bearing seeds in continuous systems for solvent extraction of oil therefrom have been set forth at length in my previous application, Ser. No. 646,034, filed February 7, 1946, Patent No. 2,467,404.

Further reference to problems encountered in the attempts to use an apparatus in a system for continuous countercurrent solvent extraction are discussed in my prior application, Ser. No. 44,494, filed August 16, 1948, entitled "System and Apparatus for Solvent Extraction of Vegetable Oils," now Patent No. 2,505,139, and which is a continuation-in-part of the application, Ser. No. 646,034, entitled, "Solvent Extraction of Vegetable Oils," and now in issue.

The present application is specifically a continuation-in-part of my application, Ser. No. 44,494, and constitutes an improvement thereover and over other previous systems.

For convenience, the nature of such a system and difficulties encountered may be briefly referred to herein, it being understood that reference should be had to both said prior applications in regard to the problems overcome in the provision of an apparatus for carrying out the system and method therein described and claimed.

As set forth in those applications, successful solvent extraction of oil from soya beans has been successfully carried out by previous conventional countercurrent solvent extraction systems. However, many commercially important oil-containing seeds, such as linseed, cottonseed, castor beans, and many others, possess the physical characteristics which present problems precluding the use of systems such as may be used for soya beans.

Most all of such seeds, which are first ground for treatment with the solvent, produce substantial portions of seed solids in small fines dispersed in an actually, or substantially, colloidal suspension. The separation of these fines from the oil-bearing miscella has constituted one of the principal difficulties and usually resulted in inefficiency due to losses as well as clogging the system.

The advantages of my process and the system and apparatus of my previous applications and the present one are that a greater proportion of high-grade oil is obtained, and the extraction of the oil from the solids of many of the most troublesome seeds is much more nearly complete.

An important advantage of my method and apparatus has been the attainment of continuous operation.

In carrying out my invention, it is necessary to provide a system, preferably of a plurality of stages which may be closed to retain the dangerous vapors of the solvent, and which may effectively move the seed solids therethrough, not only from one stage to another, but within the mixers and centrifuges of the stages.

As was stated in my application, Ser. No. 44,494, a general object of the present invention is to provide a practical system for the solvent extraction of vegetable oils universally applicable to the treatment of all oil-bearing seeds, regardless of their susceptibility to satisfactory flaking, as is the case with soya beans.

A further object of the invention is to provide such a continuous system for carrying out the foregoing objects with a minimum number of operational interruptions, such as stops for the removal of fines, or for any cause.

Related objects of the invention are to provide a system for solvent extraction of oil from seeds to produce the greatest possible yield of high grade oil, free from fines, while avoiding degradation of the proteins in the seed solids.

Another object of the invention is the inclusion of a particular type of continuously operating solid bowl centrifuge, hereinafter illustrated and described.

Such a solid bowl centrifuge was referred to, and its operation claimed in my prior method patent, above designated, and likewise more fully described but not precisely illustrated in my prior system and apparatus application. Such a centrifuge operates according to a phenomenon unexpectedly and surprisingly effective.

The present application more fully illustrates and discloses a mixing apparatus which may operate continuously and assure the required degree of mixing of the solvent and solids in each stage, both in point of time and degree of agitation.

Still another object is the controlling of the contents of the mixer while providing a means for forcibly moving the slurry from the mixer to the succeeding centrifuge at variable rates of speed or feed, while avoiding the extreme difficulties heretofore arising due to the tendency to clog impelling means and block the passages (as fully described in my application, Ser. No. 44,494).

The present apparatus avoids the difficulties arising in any system dependent upon gravity feed, and attains thereby advantages of maintaining the mixer filled, as well as permitting most convenient arrangement and location of the apparatus parts forming the several stages.

A further object includes not only the maintaining of the mixers filled and governing the flow therefrom, depending on the condition of the mixer, but accomplishes the movement of the material by variable speed pumps while avoiding clogging, congealing, gumming, etc., which would otherwise render the system inoperative in a very short time. It follows, therefore, that general objects of my system which are attained by the present apparatus, result in coordination of the stages for simplicity of structure and effectiveness of the counter-current flow and efficiency of extraction, solvent recovery and continuous operation.

A specific object includes the maintaining and governing of the equilibrium between the stages, and the provision of simple effective control of the speed and volume of pumps between the mixers and separators of the successive stages.

An arrangement of apparatus in a three-stage system embodying the parts and operating in the preferred form found to be most successful is illustrated in the accompanying drawings to which the following description relates:

In the drawings, Fig. 1 is a somewhat diagrammatic illustration of a three-stage extracting apparatus, including the mixers, thickening, compacting and separating centrifuges, pumping means and condition-responsive controls with other attendant parts in an overall counter-current system;

Fig. 2 is a somewhat diagrammatic cross-sectional detail of the preferred type of centrifuge;

Fig. 3 is a diagrammatic sectional view illustrating the general arrangement of the preferred type of mixer;

Fig. 4 is a somewhat diagrammatic view of a suitable pump and variable speed drive.

Figure 1:
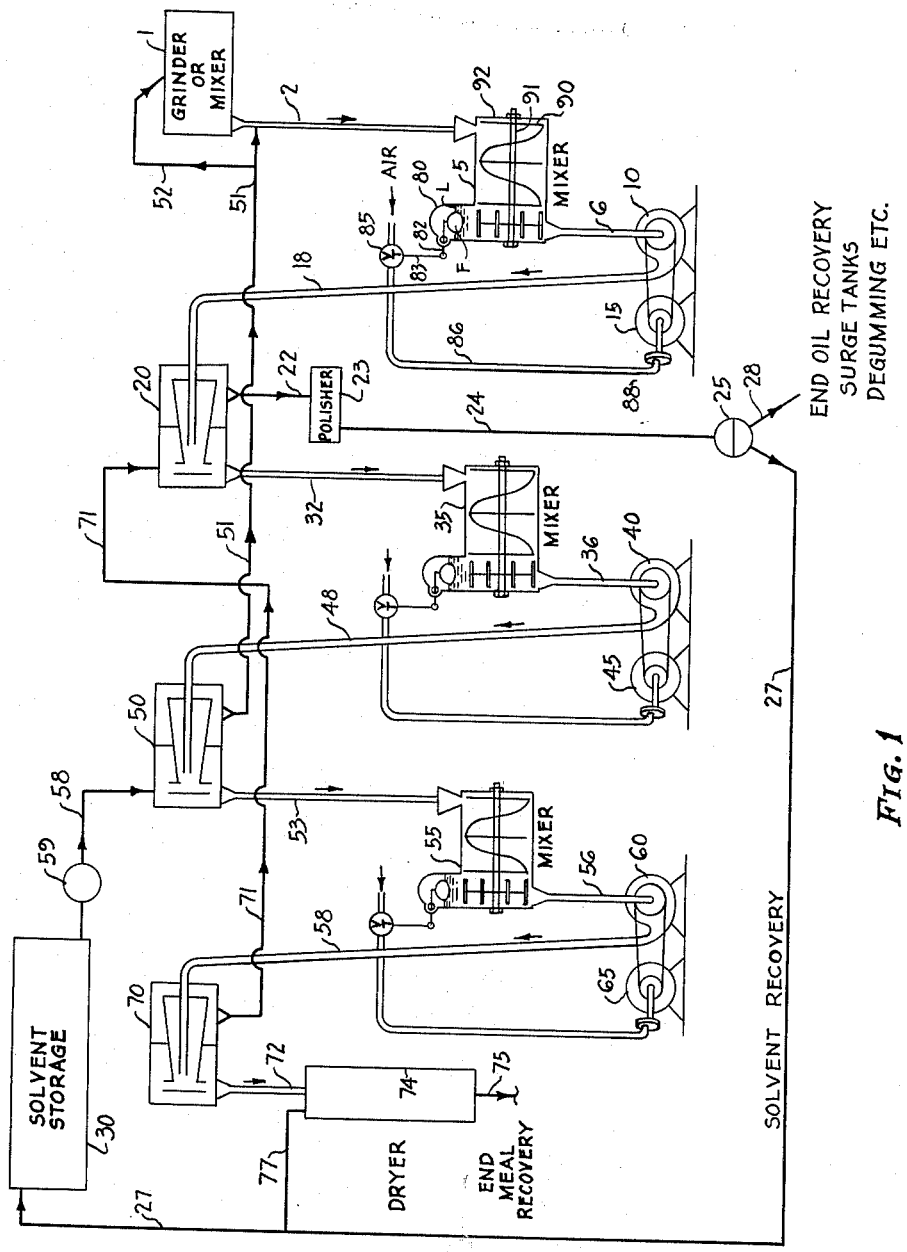

Explanatory legends and labels have been applied to the diagram of Fig. 1 in addition to reference characters. This diagram illustrates a preferred arrangement of the apparatus in my oil extraction system.

A grinder or mixer in which the oil containing mass of comminuted seed solids is intermingled with a partial miscella (oil and solvent) is indicated at 1, and is intended to represent any suitable apparatus of this nature, and may be a grinder in which the miscella is mixed with the seeds being ground, or may be a mixer only for mixing the miscella and the previously ground seeds in the desired proportion, an illustration of which, by the way, is about seventy per cent by volume of miscella with thirty per cent seed solids by volume.

From the grinder or mixer 1, the resulting slurry is passed through a pipe 2, preferably vertically downwardly, to a mixer 5. The slurry is agitated in this mixer 5 for a predetermined time, and then passes downwardly to a pumping means, here indicated as a rotary pump 10 driven by a variable speed connection from a motor 15. The speed is varied in response to a control, as will later appear.

The mixed slurry is forced from the pump 10 upwardly through a pipe 18 to a centrifuge 20. The construction of the particular centrifuge found most desirable will be further referred to in connection with Fig. 2.

At this point it need only be mentioned that the centrifuge is continuous and uninterrupted in its operation and continuously discharges the separated miscella and extracted pulp therefrom.

The solids-free miscella is drawn off from this initial separation stage through a passage 22 leading from the centrifuge 20 to a polisher indicated at 23, and thence through a line 24 to a fractionating still 25 for vaporizing solvent from the miscella and for collecting and condensing the solvent vapor. The polisher 23 may be any conventional type of filter which will remove any remaining minute quantities of fines or solid particles in the miscella as it is withdrawn from the centrifuge 20. Complete removal of any traces of "fines" by such a polisher is desirable to avoid clogging the condensers in the fractionating still. Such solid particles in the miscella are actually so minute as to be capable of being entrained by the solvent vapors leaving the still.

The fractionator 25 may be of conventional design for heating the final miscella, preferably while blowing dry steam or inert gas through it to carry off the solvent, and for collecting and condensing the solvent vapor. The solvent recovered in the fractionator 25 passes through a line 27 back to a solvent storage container 30. The extracted oil is taken from the fractionator through a line 28 to suitable containers. This is the finish or "end oil recovery" product.

The pulp or seed solids are withdrawn from the centrifuge 20 and may pass by gravity through a pipe or conduit 32 of suitable size, leading to a mixer 35, preferably of the same construction and operation as the mixer 5. The seed solids separated in the centrifuge 20 are mixed with miscella from a succeeding stage before passing to the mixer 35. A screw feed or other mechanical conveying means may be used to move the seed solids and the miscella to the mixer from the centrifuge if gravity feed is not appropriate or sufficient due to the location of the parts. However, for the purposes of the arrangement shown, gravity feed is sufficient, and no mechanically operated moving means is illustrated.

From the mixer 35 the slurry of seed solids and solvent and contained oil is passed downwardly through a conduit 36 to a pump 40 driven by a variable speed motor 45, and thence upwardly through a passage 48 to a second centrifuge 50, preferably of the same construction and operating in the same manner as the centrifuge 20.

Here again the slurry is separated into liquid miscella and solids. From this centrifuge 50 the liquid passes through a line 51 leading to the grinder or mixer 1 and/or to the passage 2 leading to the mixer or diffuser 5, there being a suitable branch 52 shown as leading to the top of the grinder or mixer 1.

The seed solids separated in the centrifuge 50 pass downwardly through a conduit 53 to a third mixer or diffuser 55, being mixed with solvent from the solvent storage 30 delivered to the appropriate portion of the centrifuge 50 through a passage 58 under the control of a regulator and pump indicated at 59.

From the mixer and diffuser 55, the slurry once more passes downwardly through a conduit 56 to a pump 60, driven at varying speeds by the motor 65, and then passes upwardly through the passage 58 to a third solid bowl centrifuge 70.

From the centrifuge 70 the liquid, partial miscella of solvent and oil separated therein, is passed through a conduit 71 back to the centrifuge 20 and into the end portion to be mixed with the seed solids delivered therefrom.

From the centrifuge 70 the comparatively dry, completely extracted seed solids separated therein are passed downwardly through a pipe or conduit 72 to a suitable dissolventizing means or dryer 74. From the dryer substantially solvent-free and oil-free meal is delivered through a passage 75 to any suitable "end meal recovery" receptacle. The final remaining solvent recovered in the dryer 74 may pass through a line 77 to the line 27 leading back to the storage container.

It will be seen that with the arrangement shown, prepared oil-rich meal is first mixed with relatively oil-rich partial miscella from the centrifuge 50 of the second stage and is then fed concurrently therewith to the mixer 5 in the initial stage. A less oil-rich miscella from the centrifuge 70 of the third stage is mixed with the partially extracted seed solids delivered from the centrifuge 20 of the first stage and is fed concurrently therewith to the mixer 35 in the second stage.

Pure solvent is introduced into the system and mixed with the twice extracted seed solids delivered from the centrifuge 50 of the second stage. These twice extracted seed solids mixed with the pure solvent as a slurry are then passed to the mixer 55 of the third stage.

It will be noted that the system may be maintained as an entirely closed system during its operation, thus retaining the dangerous vapors from the solvent which may be thus safely confined during long periods of continuous operation.

The feeding of the seed solids to the grinder or mixer may be safely accomplished by bringing the solids through closed passages in which the solids material may act as a seal preventing escape of the solvent gases. The introduction of solvent to the solvent storage may be through a suitable closed pipe, not shown.

In carrying out this system with the arrangement of apparatus shown and described, the desired proportions of meal or pulp to the amounts of extracting liquid should be maintained in the balance found most effective throughout the system. Such control is accomplished by measuring and feeding the proper quantity of meal into the initial stage along with the desired amount of fresh solvent admitted to the system as described.

For maximum efficiency, the time of mixing and diffusing in the mixers 5, 35 and 55, and consequently the rate of delivery of the slurry to the centrifuges from the mixers should be maintained in as nearly uniform relative conditions as possible.

To accomplish this important function, I employ novel automatic controls for governing the volume of flow taken from each mixer and delivered to its associated centrifuge.

A further important factor in the use of mixers of the type I have found most effective, and as herein disclosed, is that the mixer should be maintained full, and preferably with an appreciable or at least a slight hydrostatic head above the body of the shell or container of the mixer and its moving parts.

To this end I provide a raised dome or riser 80 communicating with the interior of the mixer and in which the liquid level rises, as indicated at L, to varying levels. A float F is shown as connected to a pivoted lever 82 and through a link 83 to a throttle valve 85 governing an air line 86 which in turn governs an air pressure responsive means 88 for controlling a variable speed drive between the motor 15 and pump 10.

As the level of slurry in the mixer rises, the float F will rise correspondingly, opening the throttle valve actuating the means 88 which acts to so change the drive connection between the motor 15 and the pump 10 as to increase the speed of the pump and consequently the rate of flow from the mixer 5 to its associated centrifuge 20. Likewise, as the liquid level of the slurry in the dome 80 lowers, the speed of the pump will be so altered as to slow up the movement of slurry from the mixer to the centrifuge.

The capacity of the centrifuge 20, and likewise of each of the others, is such as to assure continuous operation within its capacity for separation of the volume of material which may be efficiently handled by the mixer 5. Correspondingly, the amount of material fed to the mixer 5 from the grinder or mixer 1 is in such quantity and at a rate such as to not unduly exceed the capacity of the first mixer.

The mixer 5 is preferably of such a construction as to effect efficient diffusion of the solvent through the triturated mass of seed solids.

A preferred form of such a mixer comprises a cylindrical barrel or casing in which a series of separators or disks 90, mounted on a central shaft 91, divide the chamber into a plurality of compartments.

A spiral blade or scraper 92 may be suitably carried outside of the disks and rotate with the shaft to move the material progressively from the intake to the discharge ends of the chamber. This spiral member extends between the edges or perimeters of the separators 90 and the wall of the mixer, and the material is thus moved from one compartment to the next, assuring a thorough and uniform mixing and diffusion.

The construction illustrative of any one of the three mixers, 5, 35 or 55, is shown somewhat diagrammatically but more in detail in Fig. 3. Here it will be seen that in addition to the separators or disks 90 and the spiral blade or scraper 92, I may provide agitators 94 carried on the end of the shaft 91 and rotated thereby, and preferably located above the discharge passage 6. Assuming that the mixer is several feet long, say, six to twelve feet, and two or three feet in diameter, it will be seen that we provide a liquid column in the dome which may be anywhere from one to three feet above the "full" level of the mixer. The mixer may be suitably jacketed for heating in any suitable manner. In Fig. 3, 97 indicates such a jacket having steam inlet and outlet connections 98 and 99.

The type of centrifuge which produces an unexpected phenomena in accomplishing the separation, heretofore found extremely difficult, is known as the Bird type of solid bowl centrifuge (manufactured by Bird Machine Company, South Walpole, Mass.) which continually discharges both of the phases separated therein.

A general arrangement of such a centrifuge is illustrated in Fig. 2, and comprises an imperforate hollow bowl 100 having the interior form of a truncated cone, and which is mounted to rotate on bearings 101 and 102 and is connected with and driven by a belt pulley 104, or other suitable drive.

Driven in the same direction, but slower and thus relatively oppositely and within the cone bowl 100, is a spiral conveyor member comprising a blade of several turns indicated at 105 carried on a hollow member 106 into which the slurry is delivered. The chamber 107 is provided with two end compartments 108 and 109, the one for receiving the solids from the bowl and the other receiving the liquid at the large end of the bowl. Thus, the slurry is brought through an extension 103 of one of the pipes from the pumps where it passes outwardly through suitable orifices to the hollow member 106 and thence through feed ports into the bowl, and is subjected to the action of the mechanical ejecting means or conveyor 105, and to the centrifugal force. The latter force compacts the solids of the slurry against the interior surface of the bowl while the liquid therein is moved along said surface to the large end of the bowl.

The mechanical ejecting means, i. e., the relatively oppositely rotating spiral scraper or vane forces the solids from the bowl at the small end thereof. This longitudinally tapered spiral screw 105 has proven particularly effective for handling the large proportion of solids present in the slurries of the type to be treated by my apparatus.

The spiral vane, having a very small clearance (say of one-eighth to one-quarter of an inch) between the edges of its turns and the inner bowl wall, prevents accumulation of solids on any one part of the inner surface of the bowl, and as indicated effects a positive mechanical movement of the solids in one direction while the liquids are forced centrifugally toward the large end of the bowl.

The difficulties arising from clogging a pump and thus stopping the entire system were set forth in my copending application. I have referred in the present case to a rotary pump such as the pumps 10, 40 and 60, which I find may be satisfactorily used if kept continually running. Hence, the desirability of the variable speed drive between the motor as at 15, which variation is under the control of the liquid level and the float F in the dome of each mixer.

In Fig. 4 is diagrammatically shown, but somewhat more in detail than in Fig. 1, a suitable variable speed drive responsive to the air pressure under control of the float. The pump casing is shown as having its inlet 110 feeding on to a conical center 112 of a rotor having blades 114, preferably spiral. On the shaft 115 of the pump are a pair of pulley members 116 and 117, the one being fixed to the shaft and the other slidable under the influence of a diaphragm 120 and a suitable housing 121, connected with a pusher member 122 and acting against the slidable pulley member 117 to move it toward the companion 116 when air pressure through the pipe 86 is increased.

A spring 123 may effect a return movement and corresponding separation of the pulley members, whereby the belt 118 engages smaller diameter portions of the pulleys and correspondingly increases the speed as it is driven by a pulley 119 from the motor such as at 15.

The belt tightener or idler 124 may be used to permit change of effective length of the belt while maintaining effective tension.

Such a speed-change or variable speed devices are well known, and other forms may be used if desired, it being only necessary that the rise and fall of the liquid level in the mixer dome may effect the desired proportional increase or decrease in the rate of drive of the pump.

This apparatus is now in operation in a commercial size plant, and has proven highly effective in accomplishing its intended purpose.

From the foregoing description it will be seen I have provided a system by which I may carry out the solvent extraction in a series of steps, the number of which is illustrated as three, and which has proven sufficient to effectively, economically and rapidly extract over ninety-eight per cent of the oil. In practice the residue of extracted seed solids actually contains less than one per cent of oil.

A preliminary mixer or a mixer and grinder 1 delivers the slurry to a first mixer and diffuser 5, where the solvent is diffused through a mass of seed solids for a sufficient period of time and with such uniformity of diffusion as to dissolve a large portion of the oil from the solids.

This mixer is maintained filled and closed, and its slight head above the mixing apparatus may vary as fresh supply is fed to this first mixer. In accordance with this variation and with the time required for the first stage of diffusion, the pump 10 operates at a varying speed, drawing the slurry from the mixer and forcibly moving it to the first stage solid bowl centrifuge. Here, the seed solids are separated from the major portion of solvent and dissolved oil, which latter is passed to the fractionating still 25 where the solvent is separated from the end recovery oil, the solvent being passed back to a solvent storage as described.

As stated, the stages are coordinated into a system wherein the seed solids and solvent move countercurrent between stages. Thus, after the solids are separated from the miscella in the first centrifuge they are mixed with a solvent in the form of a partial miscella, brought to the first stage centrifuge from the third separation stage, again forming a slurry which is passed through the second diffuser and then to a similar centrifuge 50 of the second stage. The solvent and some oil from the second centrifuge 50 is passed back to the mixer or grinder 1 and to the intake passage 2 for the first mixer 5. The solids passing from the centrifuge 50 are mixed with comparatively clear oil-free solvent from the solvent storage, to form a slurry which passes to the third mixer 55 and thence to the third centrifuge 70.

The now substantially oil-free solids from this third centrifuge are passed to a dryer or desolventizer 74 to strip and recover any remaining retained solvent therefrom, which solvent is condensed and returned to storage 30 for reuse. As indicated, the miscella from the first stage centrifuge is filtered or otherwise freed of minor quantities of extraneous matter before being pumped or passed to the distillation system or fractionating still 25, from which the oil now ready for use is sent to storage and also from which the recovered solvent is returned to storage 30 for reuse in the system.

While the movement of solids and partial miscella or solvent is concurrent or substantially so, within each separation stage, the overall movement of the oil containing material introduced at the initial stage and of the solvent introduced at the second stage, and that taken from the final stage is relatively countercurrent to the solids.

Thus, it will be seen that the oil enriched miscella becomes progressively richer from the last stage toward the preceding stages.

The several passages and other parts as well as the mixers may be suitably insulated and equipped with heating coils or jackets not shown in order that the optimum operating temperatures may be maintained as desired in the several stages and throughout the system.

As stated, in such a system it is important to maintain the entire system in equilibrium or in a controlled relationship. The required minimum diffusion time should be maintained in each stage, and the movement of material through each stage must be controlled to maintain the desired relative conditions in the adjacent stages.

The variable speed driving means such as described, for the pumps 10, 40 and 60, effectively governed by changes in level of the slurry above the full mixers which in turn governs a control means such as a throttle valve has been found effective. Thus, the speed of operation and the time and amounts of seed solids admitted to the first grinder or mixer 1 and pass to the first diffuser 5 when maintained within the capacity of the centrifuges will automatically result in maintaining the coordination of the stages, at no time permitting the mixers to become partially empty, nor at any time overloading the centrifuges.

Obviously, the capacity of the fractionating still and the dryer 74 should be such as to treat the full quantity of miscella and seed solids, respectively, at the rate delivered to them.

Having thus disclosed my invention, I claim:

1. Apparatus for solvent extraction of oil-bearing seeds comprising in combination a plurality of successive extracting stages, each stage including: (1) a mixer, (2) a continuous solid bowl centrifuge connected to said mixer for separating a slurry formed in said mixer into a substantially solids-free miscella and a seed pulp, (3) a pump and connecting passages for forcibly moving the slurry from the mixer to the solid bowl centrifuge, (4) variable speed mechanism for driving the pump, and (5) means actuated by change in volume of liquid in the mixer connected with the speed change mechanism to vary the speed of the pump; the apparatus also comprising conduits for leading seed pulp from the centrifuge of one stage to the mixer of a succeeding stage, a passage for carrying liquid away from the centrifuge of the first stage, and a passage for moving substantially solids-free liquid from the centrifuge of one stage to the mixer of a preceding stage counter-current to the movement of seed solids between stages, each said mixer comprising an elongated horizontal chamber having a discharge at one end and a liquid dome in open communication therewith rising above the mixer and in which a hydrostatic head may be maintained, a float in said chamber connected to the variable speed pump driving mechanism for varying the speed of the pump, the mixer having agitating elements coextensive of its length, and all said passages, mixers and centrifuges forming a closed liquid and gas tight system.

2. Apparatus for solvent extraction of oil-bearing seeds comprising in combination a plurality of successive extracting stages, each stage including: (1) a mixer, (2) a continuous solid bowl centrifuge connected to said mixer for separating a slurry formed in said mixer into a substantially solids-free miscella and a seed pulp, (3) a pump and connecting passages for forcibly moving the slurry from the mixer to the solid bowl centrifuge, (4) variable speed mechanism for driving the pump, and (5) means actuated by change in volume of liquid in the mixer connected with the speed change mechanism to vary the speed of the pump; the apparatus also comprising conduits for leading seed pulp from the centrifuge of one stage to the mixer of a succeeding stage, a passage for carrying liquid away from the centrifuge of the first stage, and a passage for moving substantially solids-free liquid from the centrifuge of one stage to the mixer of a preceding stage counter-current to the movement of seed solids between stages, said pump being of the rotary type, and the driving mechanism including a motor for continuously driving the same and a variable speed connection between the motor and pump, a pressure-responsive device for changing the driving speed, a chamber rising from the mixer, a float and controlling connections therefrom to govern the speed changing pressure, and all said passages, mixers and centrifuges forming a closed liquid and gas tight system.

(References on following page)

References Cited in the file of this patent

UNITED STATES PATENTS

| | | |
|---|---|---|
| 863,062 | Griswald, Jr. | Aug. 13, 1907 |
| 1,381,706 | Hapgood | June 14, 1921 |
| 1,492,656 | Turreutine | May 6, 1924 |
| 2,164,189 | Hund | June 27, 1939 |
| 2,264,390 | Levine | Dec. 2, 1941 |
| 2,282,138 | Kellogg | May 5, 1942 |
| 2,377,136 | Dinley et al. | May 29, 1945 |
| 2,381,965 | Berry | Aug. 14, 1945 |

FOREIGN PATENTS

| | | |
|---|---|---|
| 144,240 | Great Britain | Apr. 21, 1921 |
| 272,118 | Great Britain | June 9, 1927 |

OTHER REFERENCES

Riegel (Chem. machinery) Reinhold Publishing Corporation, 1944, pp. 309–311.

Chemical Eng. Handbook, 3d ed., J. H. Perry, McGraw-Hill Book Co., New York, New York, 1950, pp. 1202–1220.